United States Patent Office 3,775,493
Patented Nov. 27, 1973

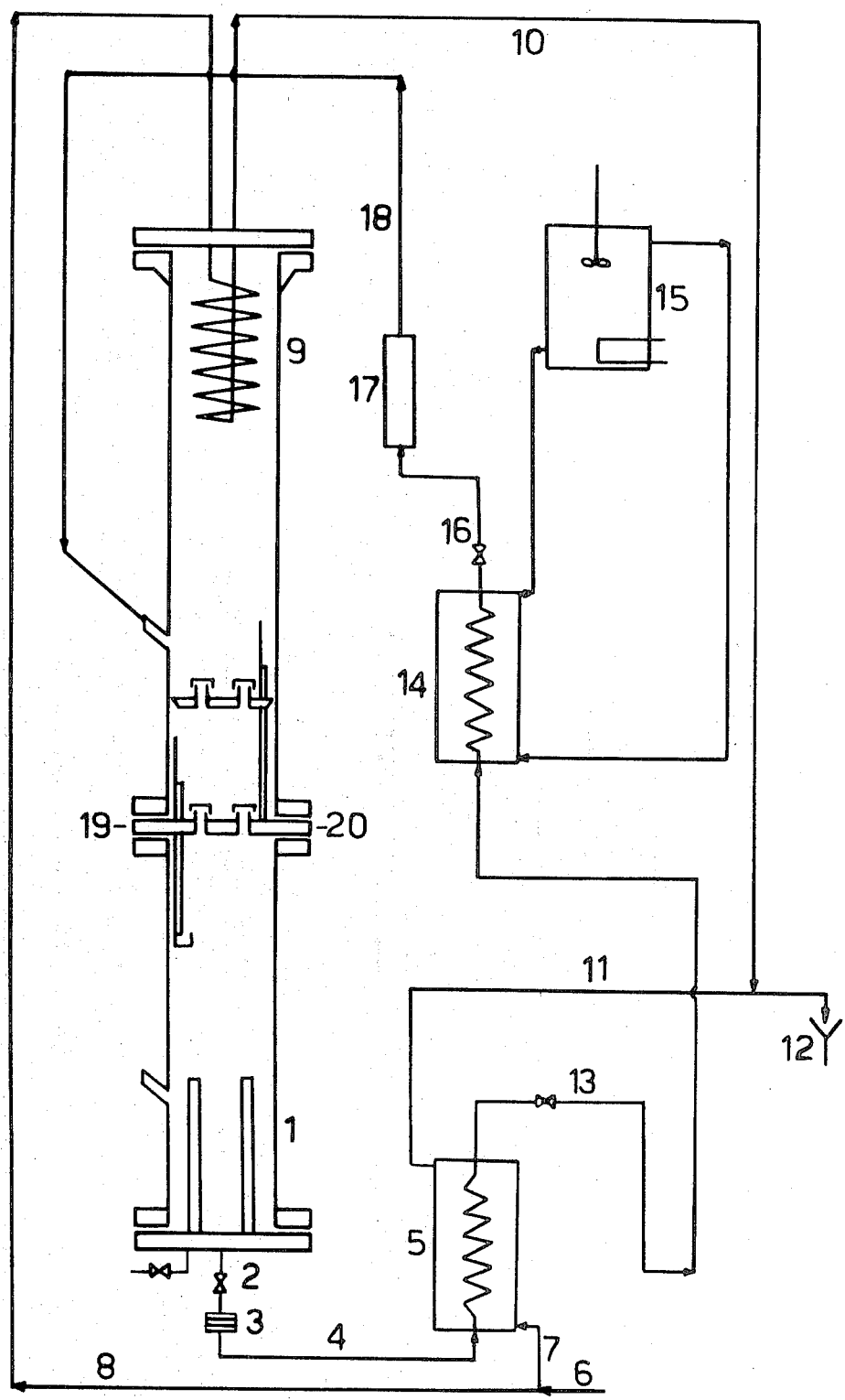

3,775,493
METHOD FOR INHIBITING THE POLYMERIZATION OF CONJUGATED DIENES
Renato De Simone, Como, Alessandro Béranger, San Donato Milanese, and Antonietta Scaramucci, Milan, Italy, assignors to Snam Progetti S.p.A., San Donato Milanese, Italy
Filed Mar. 3, 1972, Ser. No. 231,534
Claims priority, application Italy, Mar. 3, 1971, 21,250/71
Int. Cl. C07c 7/00
U.S. Cl. 260—666.5
9 Claims

ABSTRACT OF THE DISCLOSURE

There is provided a method for preventing the polymerization of conjugated dienes during separation from product streams, the method comprising adding inhibiting quantities of halogen derivatives of quinones to the solvent used to extract the conjugated diene from its product stream.

---

The present invention relates to a method for preventing the polymerization of easily polymerizable unsaturated systems.

More particularly it consists in adding small amounts of inhibitors to the solvent employed in the extractive distillation of conjugated dienes from streams containing same in order to prevent the polymerization thereof.

It is known that peculiar techniques, among which the extractive distillation is to be emphasized, are used in the processes of recovering conjugated dienes from mixtures containing same.

During said processes, however, the solvent containing the conjugated diene is necessarily brought to high temperatures, which cause the polymerization of the diene compound in the distillation plants employed for isolating and purifying it.

The above fact gives rise to stoppages of the columns and to formations of foams and deposits which decrease the run of the process itself and practically stop it after some time.

The nature and the forming method of the mentioned polymers are not well known: for instance it is thought that three kinds of polymer are formed when the diene is butadiene:

(a) A liquid dimer, fundamentally constituted by 4-vinylcyclohexene, which does not polymerize any more in an appreciable amount and the formation of which depends only on the temperature and on the monomer concentration; it seems there is no inhibitor preventing dimer formation from butadiene;

(b) A gummy polymer having a linear chain, at high molecular weight, the forming rate of which directly depends on the square root of the concentration of peroxides and active oxygen;

(c) A solid polymer, insoluble and infusible (popcorn), which may be started by various factors as active oxygen, iron oxidized in presence of water and air, and the like.

Among the cited polymers, the more harmful ones in the separating process based on the extractive distillation are the solid polymers, for the aforesaid reasons and because of the explosive characteristics shown by the ones containing polyperoxides.

The formation of these polymers may be avoided at room temperature by adding polymerization inhibitors such as hydroquinone, 4-t-butylcatechol, β-naftylamine, methylene blue, sodium nitrite and so on. However the cited polymerization inhibitors do not give satisfactory results in preventing conjugated dienes from polymerization when the diene compounds are heat treated for a long time.

The present invention proposes to show a method stabilizing conjugated systems, which makes use of inhibitors which are very efficacious over long periods in preventing the formation of solid polymers both in the liquid, and in the gaseous phase; the used inhibitors are very cheap, of high thermal stability and efficient even when present at low concentrations. Particularly the present invention relates to a method proposing to decrease the polymerization of conjugated dienes in solution; the inventive method comprises adding to the solution, as polymerization inhibitors, halogen derivatives of quinones selected from: 2,5-dichloro-p-benzoquinone; 2,6-dichloro-p-benzoquinone; 2,3-dichloro - 5,6 - dicyano-p-benzoquinone; 2,3,5,6-tetrachloro-p-benzoquinone (chloroanile); 2,3,5,6-tetrabromo-p-benzoquinone (bromanile); 2,3,5,6-tetraiodo-p-benzoquinone (iodanile) and the like; mixtures thereof or mixtures of same with known inhibitors such as, for instance, aromatic nitroderivatives, mercaptobenzothiazole, p - quinone - dioxime, p-t-butylcatechole, furfurol, benzaldehyde and so on.

The inhibitors employed according to the inventive method are thermally stable at high temperatures and also possess the advantages of being employable in lower amounts and presenting a greater efficacy than the known inhibitors.

The invention may be particularly applied to butadiene and isoprene solutions in solvents usually employed in the separation processes of conjugated dienes from mixtures containing same, which make use of the extractive distillation; the more common solvents are: sulpholane, acetone, acetonitrile, dimethylformamide, dimethylacetamide, N-methyl-pyrrolidone, β-methoxypropionitrile, aniline, morpholine, formylmorpholine, 4-methylmorpholine, acetone-morpholine, or mixtures thereof or mixtures of same with water.

The amount of employed inhibitor may be very low, up to a few p.p.m. with respect to the solvent; depending on the solvent type, on the amount of the water present and on the working conditions.

Generally speaking use in the range from 50 to 200 p.p.m. is satisfactory, but using different amounts does not have harmful effects. In order to emphasize the advantages obtainable from the employment of the inhibitors according to the present invention, some tests have been carried out by employing butadiene and isoprene, at different times, temperatures and water amounts, both in steel autoclaves and in distillation columns.

Contemporaneously similar tests have been carried out by employing p-t-butylcatechol, which is now the commonly employed inhibitor in the extractive distillation of dienes, and also tests without any inhibitor.

Said tests illustrated the remarkable efficacy and superiority of halogen quinones with respect to the inhibitors commonly employed. Some other characteristics of the use of halogenquinones as polymerization inhibitors will be apparent from the following examples.

EXAMPLE I

In Table I are reported the results of polymerization tests carried out in stainless steel autoclaves by using solutions constituted by 1.1% by weight of butadiene in formylmorpholine at 10% water, at 150° C. and 24 hours as contact time.

Parallel tests were carried out in order to compare the results obtained by the inventive inhibitors with the ones obtained by employing either known inhibitors or no inhibitor.

The tests were performed by using 200 p.p.m. of the following compounds: bromanile, chloranile, 2,5-dichlorop-benzoquinone, 2,6-dichloro-p-benzoquinone, and t-butylcatechol and by working under the same conditions:

TABLE I

| Temp., °C. | Time, hours | Inhibitor | Solid polymer obtained (percent b.w. with respect to butadiene) |
|---|---|---|---|
| 150 | 24 | 200 p.p.m. 2,5-dichloro-p-benzoquinone | Absent |
| 150 | 24 | 200 p.p.m. 2,6-dichloro-p-benzoquinone | Absent |
| 150 | 24 | 220 p.p.m. chloranile | Absent |
| 150 | 24 | 200 p.p.m. bromanile | Absent |
| 150 | 24 | 200 p.p.m. t-butylcatechol | 2 |
| 150 | 24 | No one | 5-9 |

EXAMPLE II

Polymerization tests were carried out in stainless steel autoclaves at 120° C., at various contact times, various chloroanile percentages, and with 200 p.p.m. of dichlorodicyanoquinone or anthraquinone: use was made of solutions constituted by 2.7% b.w. of isoprene in formylmorpholine at 5% b.w. water.

The results are reported in Table II.

TABLE II

| Temp., °C. | Contact time, hours | Inhibitor | Solid polymer obtained (percent b.w. with respect to isoprene) |
|---|---|---|---|
| 120 | 48 | No one | 2.3-5.3 |
| 120 | 48 | 50 p.p.m. chloranile | 0.04 |
| 120 | 48 | 100 p.p.m. chloranile | 0.4-0.6 |
| 120 | 48 | 200 p.p.m. chloranile | 0.04-0.2 |
| 120 | 48 | 200 p.p.m. anthraquinone | 1 |
| 120 | 96-100 | No one | 3.6-3.8 |
| 120 | 96-100 | 200 p.p.m. chloranile | 0.5-0.7 |
| 120 | 96 | 200 p.p.m. dichlorodicyanoquinone | 0.04 |

EXAMPLE III

Some tests were carried out at 150° C., for 24 hours, by making use of 1.1–1.2% b.w. butadiene or 1.5–1.8% b.w. isoprene in formylmorpholine at 5% b.w. water and containing 0.5–20% morpholine. The obtained results are reported in Table III.

TABLE III

| Temp., °C. | Time, hours | Hydrocarbon | Percent b.w. morpholine | Inhibitor | Solid polymer obtained (percent b.w. with respect to hydrocarbon) |
|---|---|---|---|---|---|
| 150 | 24 | Isoprene | 0.5 | No one | 4.7 |
| 150 | 24 | do | 0.5 | 200 p.p.m. t-butylcatechol | 4.5 |
| 150 | 24 | do | 0.5 | 200 p.p.m. chloranile | 0.1 |
| 150 | 24 | Butadiene | 20 | No one | 8.7 |
| 150 | 24 | Isoprene | 20 | do | 6.3 |
| 150 | 24 | Butadiene | 20 | 200 p.p.m. t-butylcatechol | 5.4 |
| 150 | 24 | Isoprene | 20 | 200 p.p.m. t-butylcatechol | 6.6 |
| 150 | 24 | Butadiene | 20 | 200 p.p.m. chloranile | 0.9 |
| 150 | 24 | Isoprene | 20 | do | 1.0 |

EXAMPLE IV

By employing 1.2% b.w. of butadiene some tests were carried out in N,N-dimethylformamide (DMF) at 5% by weight water and in N-methylpyrrolidone at 5% b.w. water, at 150° C. for 24 hours, with or without any inhibitor.

The results are reported in Table IV.

TABLE IV

| Temp., °C. | Time, hours | Solvent containing 5% b.w. of H₂O | Inhibitor | Solid polymer obtained (percent b.w. with respect to butadiene) |
|---|---|---|---|---|
| 150 | 24 | DMF | No one | 0.5 |
| 150 | 24 | NMP | do | 0.3 |
| 150 | 24 | DMF | 200 p.p.m. t-butylcatechol | 0.3 |
| 150 | 24 | NMP | do | 0.2 |
| 150 | 24 | DMF | 200 p.p.m. chloranile | Absent |
| 150 | 24 | NMP | do | Absent |

EXAMPLE V

In parallel to the tests performed in autoclave, some other tests were carried out by employing apparatuses showing the probable conditions of the bottom of the extractive distillation column.

The following drawing is a schematic description of the apparatus.

The zone of the column bottom is critical to the polymer formation because of its relatively high temperature.

The apparatus drawn in FIG. 1 is constituted by a portion of an extractive distillation column provided with only two plates; the bottom is provided with two resistances, heating the liquid, wherein they are plunged, 1, whereas the top 9 is provided with a water condenser.

From the electrical resistance boiler 1, kept at a temperature of 115–140° C., there was continuously drawn, through 2, the boiling solution, by filtering it through the stainless steel mesh filter 3.

By 4 the solution reached the water refrigerator 5 wherein it was cooled. The water was fed to the water refrigerator through 6 and 7 and to the overhead condenser 9 through 6 and 8.

By 10 and 11 water flowed from condenser 9 and refrigerator 5, respectively, and was discharged into sewer 12.

From the water refrigerator 5, through 13, the solution passed into the feeding preheater 14, kept at a suitable temperature by a thermostatic bath 15.

From 14 the solution went out and was fed above the first plate by 18, after having crossed, through 16, the thermostat 17 kept at a temperature of about 50° C.

19 and 20 are the drawing points of the samples, respectively of liquid and vapour.

In order to emphasize the polymerization amount and speed up the tests, same were carried out under a light pressure (1–8 ata.), so as to reach the desired temperature in the column bottom.

Use was made of a "polymerization grade" isoprene and, as a solvent, formylmorpholine at 5% b.w. water.

The isoprene concentration was kept at about 3% b.w.

The inhibitors tested were t-butylcatechol (TBC), nitromethane, p-nitrosodimethylaniline (PNDA), hydroquinone and chloroanile.

By TBC the polymerization was always noted. Also PNDA and nitromethane gave no satisfactory result. The zone interested to the polymer formation was fundamentally the liquid-vapour separation zone and the downcomer little glass of the last plate.

A light fog of polymer was sometimes observed on the resistances.

Only chloroanile gave good results, much better than the ones obtained by means of the other tested inhibitors; this fact confirmed what was seen in autoclave.

The results of the tests are reported in Table V.

TABLE V

| Test No. | Inhibitor | (p.p.m) | Test time (hour) | Test pressure (ata.) | Boiler temperature, °C. | Polymer presence |
|---|---|---|---|---|---|---|
| 1 | TBC | 30 | 55 | 1.8 | 125-134 | Yes. |
| 2 | TBC | 200 | 55 | 1.8 | 123-128 | Yes. |
| 3 | TBC | 200 | 50 | 1.8 | 133-145 | Yes. |
| 4 | TBC | 50 | 50 | 1.8 | 133-150 | Yes. |
| 5 | TBC | 250 | 53 | 1.8 | 125-135 | Yes. |
| 6 | PNDA | 100 | 35 | 1.8+2.15 | 126-137 | Yes. |
| 7 | Nitromethane | 1,000 | 52 | 1.8+2.15 | 115-135 | Yes. |
| 8 | Hydroquinone | 200 | 50 | 1.8 | 115-123 | Yes. |
| 9 | Chloranile | 250 | 52 | 1.7+1.9 | 117-128 | Traces. |

We think the inhibitor action is to be attributed to the adding of halogenquinones to the diene solutions during the extractive distillation, but this action might be caused by intermediate products which are formed in process itself and to which halogen-quinone participates. Without entering the reaction mechanism, we think it is obvious the present invention relates also to the intermediates eventually formed and to their use as polymerization inhibitors.

What we claim is:

1. Method for inhibiting the polymerization of conjugated dienes in solution at temperatures ranging from 115 to 116° C. which comprises adding, as polymerization inhibitor, a halogen-quinone derivative selected from the group consisting of chloroanile, bromoanile, iodanile, 2,5-dichlorobenzoquinone, 2,6-dichlorobenzoquinone, dichlorodicyanoquinone, mixtures thereof and mixtures of the same with known inhibitors.

2. Method for inhibiting the polymerization of conjugated dienes according to claim 1 characterized in that the employed halogen-quinone is chloroanile.

3. Method for inhibiting the polymerization of conjugated dienes according to claim 1 characterized in that the employed halogen-quinone is bromanile.

4. Method for inhibiting the polymerization of conjugated dienes according to claim 1 characterized in that the employed halogen-quinone is 2,5-dichloro-p-benzoquinone.

5. Method for inhibiting the polymerization of conjugated dienes according to claim 1 characterized in that the employed halogen-quinone is 2,6-dichloro-p-benzoquinone.

6. Method for inhibiting the polymerization of conjugated dienes according to claim 1 characterized in that the employed halogen-quinone is 2,3-dichloro-5,6-dicyano-p-benzoquinone.

7. Method for inhibiting the polymerization of conjugated dienes according to claim 1 characterized in that the conjugated diene is butadiene.

8. Method for inhibiting the polymerization of conjugated dienes according to claim 1 characterized in that the conjugated diene is isoprene.

9. Method for inhibiting the polymerization of conjugated dienes dissolved in a solvent selected from the group consisting of sulpholane, furfural, acetone acetonitrile, dimethyl formamide, dimethylacetamide, N-methylpyrrolidone, β-methoxypropionitrile, aniline, morpholine, formylmorpholine, 4-methylmorpholine, acetonemorpholine, mixtures thereof and mixtures of the same with water, at temperatures ranging from 115 to 116° C. which comprises adding, as polymerization inhibitor, a halogen-quinone selected from the group consisting of chloroanile, bromoanile, iodanile, 2,5-dichlorobenzoquinone, 2,6-dichlorobenzoquinone, dichlorodicyanoquinone, mixtures thereof and mixtures of the same with known inihibitors.

References Cited
UNITED STATES PATENTS

| 3,557,232 | 1/1971 | Starnes | 203—9 |
| 3,340,160 | 9/1967 | Waldby | 203—9 |
| 2,064,571 | 12/1936 | Smith | 203—9 |
| 2,399,340 | 4/1936 | Franz | 203—9 |

DELBERT E. GANTZ, Primary Examiner

J. M. NELSON, Assistant Examiner

U.S. Cl. X.R.

203—9; 208—48 AA; 260—681.5 R